United States Patent
Schwarz et al.

(10) Patent No.: US 10,759,545 B2
(45) Date of Patent: Sep. 1, 2020

(54) HYBRID ELECTRIC AIRCRAFT SYSTEM WITH DISTRIBUTED PROPULSION

(71) Applicant: United Technologies Corporation, Farmington, CT (US)

(72) Inventors: Frederick M. Schwarz, Glastonbury, CT (US); Zubair Ahmed Baig, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 74 days.

(21) Appl. No.: 16/012,040

(22) Filed: Jun. 19, 2018

(65) Prior Publication Data
US 2019/0382123 A1   Dec. 19, 2019

(51) Int. Cl.
*B64D 31/06* (2006.01)
*B64D 27/02* (2006.01)
(Continued)

(52) U.S. Cl.
CPC .............. *B64D 31/06* (2013.01); *B64D 27/02* (2013.01); *B64D 27/12* (2013.01); *B64D 27/24* (2013.01); *B64D 31/14* (2013.01); *F02C 6/14* (2013.01); *F02C 6/20* (2013.01); *H02K 7/1823* (2013.01); *H02K 7/20* (2013.01); *H02K 11/0094* (2013.01); *B64D 2027/026* (2013.01); *F05D 2220/323* (2013.01); *F05D 2220/76* (2013.01)

(58) Field of Classification Search
CPC ........ B64D 31/06; B64D 27/02; B64D 27/12; B64D 27/24; B64D 31/14; B64D 2027/026; F02C 6/14; F02C 6/20; H02K 7/1823; H02K 7/20; H02K 11/0094; F05D 2220/323; F05D 2220/76
See application file for complete search history.

(56) References Cited

U.S. PATENT DOCUMENTS

| 2,604,276 A | 7/1952 | Huben |
| 2,964,264 A | 12/1960 | Multhopp |

(Continued)

FOREIGN PATENT DOCUMENTS

GB   2542184 A   3/2017

OTHER PUBLICATIONS

Wikipedia, Rejected takeoff, Apr. 10, 2015, https://web.archive.org/web/20150410225101/https://en.wikipedia.org/wiki/Rejected_takeoff. (Year: 2015).*

(Continued)

*Primary Examiner* — Aaron L Troost
(74) *Attorney, Agent, or Firm* — Cantor Colburn LLP (57) ABSTRACT

A propulsion system for an aircraft includes at least one gas turbine engine, an electric auxiliary fan driving motor configured to selectively receive electric power input from one or more electric power sources, and at least one auxiliary propulsion fan configured to selectively receive a motive force from either or both of the at least one gas turbine engine and the electric auxiliary fan driving motor. The propulsion system also includes a controller configured to establish a plurality of takeoff thrust settings of the at least one gas turbine engine and the electric auxiliary fan driving motor such that a minimum total aircraft thrust required for takeoff of the aircraft is produced.

19 Claims, 6 Drawing Sheets

(51) Int. Cl.
  *B64D 27/12* (2006.01)
  *B64D 27/24* (2006.01)
  *B64D 31/14* (2006.01)
  *H02K 7/18* (2006.01)
  *H02K 11/00* (2016.01)
  *F02C 6/20* (2006.01)
  *F02C 6/14* (2006.01)
  *H02K 7/20* (2006.01)

(56) References Cited

U.S. PATENT DOCUMENTS

| | | |
|---|---|---|
| 2,988,301 A | 6/1961 | Fletcher |
| 3,018,987 A | 1/1962 | Multhopp |
| 3,054,577 A | 9/1962 | Wolf et al. |
| 3,073,547 A | 1/1963 | Fischer |
| 3,081,964 A | 3/1963 | Quenzler |
| 3,109,614 A | 11/1963 | Steidl |
| 3,136,499 A | 6/1964 | Kessler |
| 3,181,810 A | 5/1965 | Olson |
| 3,194,516 A | 7/1965 | Messerschmitt |
| 3,255,825 A | 6/1966 | Mouille et al. |
| 3,415,468 A | 12/1968 | Labombarde |
| 3,417,946 A | 12/1968 | Hartley |
| 3,576,300 A | 4/1971 | Palfreyman |
| 3,592,415 A | 7/1971 | Walley et al. |
| 3,643,439 A | 2/1972 | Petersen |
| 3,820,746 A | 6/1974 | Vedova |
| 3,946,554 A | 3/1976 | Neumann |
| 3,972,490 A | 8/1976 | Zimmermann et al. |
| 3,995,794 A | 12/1976 | Lanier |
| 4,030,688 A | 6/1977 | Pellarini |
| 4,050,651 A | 9/1977 | Neal et al. |
| 4,149,688 A | 4/1979 | Miller, Jr. |
| D264,838 S | 6/1982 | Dornier |
| 4,387,866 A | 6/1983 | Eickmann |
| 4,447,022 A | 5/1984 | Lion |
| 4,492,353 A | 1/1985 | Phillips |
| 4,531,620 A | 7/1985 | Stone |
| 4,605,185 A | 8/1986 | Reyes |
| 4,917,332 A | 4/1990 | Patterson, Jr. |
| 4,925,131 A | 5/1990 | Eickmann |
| D308,663 S | 6/1990 | Carlson et al. |
| 4,953,812 A | 9/1990 | Van Der Hoeven |
| 4,966,338 A | 10/1990 | Gordon |
| 4,976,396 A | 12/1990 | Carlson et al. |
| 4,982,914 A | 1/1991 | Eickmann |
| 5,096,142 A | 3/1992 | Rodriguez |
| 5,115,996 A | 5/1992 | Moller |
| 5,443,229 A | 8/1995 | O'Brien et al. |
| 5,779,191 A | 7/1998 | Brislawn |
| 5,957,405 A | 9/1999 | Williams |
| 6,134,876 A | 10/2000 | Hines et al. |
| 6,394,389 B1 | 5/2002 | Saiz |
| 6,575,406 B2 | 6/2003 | Nelson |
| 6,612,522 B1 | 9/2003 | Aldrin et al. |
| 6,688,552 B2 | 2/2004 | Franchet et al. |
| 6,824,092 B1 | 11/2004 | Franklin, III et al. |
| 6,834,495 B2 | 12/2004 | Saito et al. |
| 6,921,045 B2 | 7/2005 | Chang et al. |
| 7,107,756 B2 | 9/2006 | Rolt |
| 7,900,865 B2 | 3/2011 | Moore et al. |
| 7,900,868 B2 | 3/2011 | Sankrithi et al. |
| 7,905,449 B2 | 3/2011 | Cazals et al. |
| 7,926,760 B2 | 4/2011 | Gall et al. |
| 7,967,243 B2 | 6/2011 | Verde Preckler et al. |
| 8,011,613 B2 | 9/2011 | Belleville |
| 8,015,796 B2 | 9/2011 | Babu et al. |
| 8,074,924 B2 | 12/2011 | Cros |
| 8,167,239 B2 | 5/2012 | Guering et al. |
| 8,256,709 B2 | 9/2012 | Negulescu |
| 8,313,055 B2 | 11/2012 | Gall et al. |
| 8,322,655 B1 | 12/2012 | Kismarton et al. |
| 8,393,567 B2 | 3/2013 | Moore et al. |
| 8,544,787 B2 | 10/2013 | Lee et al. |
| 8,573,531 B2 | 11/2013 | Cazals et al. |
| 8,579,230 B2 | 11/2013 | Diochon et al. |
| 8,628,040 B2 | 1/2014 | Moore et al. |
| 8,632,032 B2 | 1/2014 | Butler et al. |
| 8,651,414 B2 | 2/2014 | Cazals et al. |
| 8,684,302 B2 | 4/2014 | Chanez et al. |
| 8,720,815 B2 | 5/2014 | Vetters et al. |
| 9,266,605 B2 | 2/2016 | Richter et al. |
| 9,346,551 B2 | 5/2016 | Stretton |
| 9,475,579 B2 | 10/2016 | Frederiks et al. |
| 9,493,245 B2 | 11/2016 | Salyer |
| 9,540,113 B2 | 1/2017 | Gukeisen |
| 9,567,062 B2 | 2/2017 | Chandler et al. |
| 9,573,693 B2 | 2/2017 | Cazals et al. |
| 9,701,395 B2 | 7/2017 | Veilleux, Jr. et al. |
| 9,764,848 B1 | 9/2017 | Vondrell et al. |
| 9,821,917 B2 | 11/2017 | Becker et al. |
| 9,834,305 B2 | 12/2017 | Taylor et al. |
| 9,845,159 B2 | 12/2017 | Suciu et al. |
| 9,884,687 B2 | 2/2018 | Marrinan et al. |
| 9,914,528 B2 | 3/2018 | Hirano et al. |
| 9,957,042 B1 | 5/2018 | Vander Lind et al. |
| 9,957,055 B2 | 5/2018 | Marrinan et al. |
| 9,975,631 B1 | 5/2018 | Mclaren et al. |
| 10,071,801 B2 | 9/2018 | North et al. |
| 10,106,265 B2 | 10/2018 | Yao et al. |
| 10,107,500 B2 | 10/2018 | O'Flarity |
| 10,112,696 B2 | 10/2018 | Chandler et al. |
| 10,267,263 B2 | 4/2019 | Lord et al. |
| 10,287,991 B2 | 5/2019 | Suciu et al. |
| 10,435,163 B2 | 10/2019 | Gallet |
| 10,450,079 B2 | 10/2019 | Beutin |
| 2001/0011691 A1 | 8/2001 | Provost |
| 2002/0189230 A1 | 12/2002 | Franchet et al. |
| 2004/0025493 A1 | 2/2004 | Wojciechowski |
| 2006/0011780 A1 | 1/2006 | Brand et al. |
| 2007/0010257 A1 | 1/2007 | Capuzzello et al. |
| 2007/0102575 A1 | 5/2007 | Morgan et al. |
| 2008/0048065 A1 | 2/2008 | Kuntz |
| 2008/0098719 A1 | 5/2008 | Addis |
| 2008/0099632 A1 | 5/2008 | Addis |
| 2008/0245925 A1 | 10/2008 | Udall |
| 2009/0229243 A1 | 9/2009 | Guemmer |
| 2010/0212288 A1 | 8/2010 | Suchezky et al. |
| 2011/0150645 A1 | 6/2011 | Moore et al. |
| 2011/0184623 A1* | 7/2011 | De Boer ............... B64D 31/10 701/99 |
| 2011/0315809 A1 | 12/2011 | Oliver |
| 2012/0128487 A1 | 5/2012 | Eames |
| 2014/0021292 A1 | 1/2014 | West |
| 2014/0117152 A1 | 5/2014 | Suciu et al. |
| 2014/0119903 A1 | 5/2014 | Suciu et al. |
| 2014/0130512 A1 | 5/2014 | Chouard et al. |
| 2014/0183296 A1 | 7/2014 | Suciu et al. |
| 2014/0260182 A1 | 9/2014 | Suciu et al. |
| 2014/0360206 A1 | 12/2014 | Bradbrook |
| 2015/0144742 A1 | 5/2015 | Moxon |
| 2015/0226117 A1 | 8/2015 | Suciu et al. |
| 2015/0284067 A1 | 10/2015 | Suciu et al. |
| 2015/0292411 A1 | 10/2015 | Suciu et al. |
| 2015/0298794 A1 | 10/2015 | Suciu et al. |
| 2015/0298814 A1 | 10/2015 | Suciu et al. |
| 2016/0010589 A1 | 1/2016 | Rolt |
| 2016/0017844 A1 | 1/2016 | Suciu et al. |
| 2016/0076447 A1 | 3/2016 | Merlo et al. |
| 2016/0144966 A1 | 5/2016 | Trahmer et al. |
| 2016/0152318 A1 | 6/2016 | Alexander |
| 2016/0229532 A1 | 8/2016 | Shapery |
| 2016/0236790 A1* | 8/2016 | Knapp ................. B64C 11/001 |
| 2016/0355272 A1 | 12/2016 | Moxon |
| 2016/0355275 A1* | 12/2016 | Seger ................. F02C 7/32 |
| 2016/0356225 A1 | 12/2016 | Sheridan |
| 2017/0081034 A1 | 3/2017 | Marrinan et al. |
| 2017/0081035 A1 | 3/2017 | Becker et al. |
| 2017/0101191 A1 | 4/2017 | Becker et al. |
| 2017/0121031 A1 | 5/2017 | Stieger et al. |
| 2017/0129617 A1 | 5/2017 | Shah et al. |
| 2017/0137134 A1 | 5/2017 | Vessot et al. |
| 2017/0137135 A1 | 5/2017 | Chanez et al. |

(56) References Cited

U.S. PATENT DOCUMENTS

| | | |
|---|---|---|
| 2017/0167437 A1 | 6/2017 | Cazals et al. |
| 2017/0233060 A1 | 8/2017 | Glover et al. |
| 2017/0291693 A1 | 10/2017 | Niergarth et al. |
| 2017/0297727 A1 | 10/2017 | Niergarth et al. |
| 2017/0297728 A1 | 10/2017 | Niergarth |
| 2017/0313430 A1 | 11/2017 | Pautis et al. |
| 2017/0361939 A1 | 12/2017 | Negulescu et al. |
| 2017/0369179 A1 | 12/2017 | Bradbrook |
| 2018/0037331 A1 | 2/2018 | Suciu et al. |
| 2018/0043997 A1 | 2/2018 | Ramakrishnan et al. |
| 2018/0050810 A1 | 2/2018 | Niergarth et al. |
| 2018/0050811 A1 | 2/2018 | Niergarth et al. |
| 2018/0051654 A1 | 2/2018 | Suciu et al. |
| 2018/0051701 A1 | 2/2018 | Kupiszewski et al. |
| 2018/0057150 A1 | 3/2018 | Cheung et al. |
| 2018/0065743 A1 | 3/2018 | Vondrell et al. |
| 2018/0080378 A1 | 3/2018 | Alecu |
| 2018/0087396 A1 | 3/2018 | Van Der Merwe et al. |
| 2018/0093754 A1 | 4/2018 | Cheung |
| 2018/0093777 A1 | 4/2018 | Cheung |
| 2018/0127089 A1 | 5/2018 | Welstead et al. |
| 2018/0156109 A1 | 6/2018 | Suciu et al. |
| 2018/0170556 A1 | 6/2018 | Goodman et al. |
| 2018/0170560 A1 | 6/2018 | Conti et al. |
| 2018/0178920 A1 | 6/2018 | Swann et al. |
| 2018/0251228 A1* | 9/2018 | Sands ................. F01D 15/12 |
| 2018/0327104 A1 | 11/2018 | Abele et al. |
| 2018/0370641 A1* | 12/2018 | Dindar ................. B64D 27/10 |
| 2018/0370644 A1* | 12/2018 | Coat .................... B64D 27/00 |
| 2019/0031363 A1 | 1/2019 | Hoisington |
| 2019/0344898 A1 | 11/2019 | Scothern |

OTHER PUBLICATIONS

Wikipedia, Vspeeds, Apr. 10, 2015, http://web.archive.org/web/20150410000912/https://en.wikipedia.org/wiki/V_speeds.(Year: 2015).*
Wikipedia, Balanced field takeoff, Apr. 10, 2015, http://web.archive.org/web/20150410233242/https://en.wikipedia.org/wiki/Balanced_field_takeoff; (Year: 2015).*

* cited by examiner

HYBRID ELECTRIC AIRCRAFT SYSTEM WITH DISTRIBUTED PROPULSION

BACKGROUND

Exemplary embodiments pertain to aircraft propulsion, and more particularly to systems and methods for a hybrid electric aircraft system with distributed propulsion between multiple engines and at least one thrust producing auxiliary fan module.

Aircraft, such as those utilized by commercial airlines, typically include two or more gas turbine engines mounted in or under the wings of the aircraft. The engines generate thrust, propelling the aircraft forward and allowing operation of the aircraft. A typical engine utilized in this configuration includes a fan forward of a turbine engine core, with the turbine engine core driving the rotation of the fan either via a direct drive system or a geared connection.

During flight, air passing over the fuselage of the aircraft forms a boundary layer immediately adjacent the fuselage due to friction between the air and the fuselage. The boundary layer resists forward motion through the air. In order to overcome the resistance of the boundary layer, the engines are typically oversized relative to a thrust requirement of the aircraft were the boundary layer to not be present.

BRIEF DESCRIPTION

Disclosed is a propulsion system for an aircraft. The propulsion system includes at least one gas turbine engine, an electric auxiliary fan driving motor configured to selectively receive electric power input from one or more electric power sources, and at least one auxiliary propulsion fan configured to selectively receive a motive force from either or both of the at least one gas turbine engine and the electric auxiliary fan driving motor. The propulsion system also includes a controller configured to establish a plurality of takeoff thrust settings of the at least one gas turbine engine and the electric auxiliary fan driving motor such that a minimum total aircraft thrust required for takeoff of the aircraft is produced.

In addition to one or more of the features described above or below, or as an alternative, further embodiments may include where the one or more electric power sources include a generator driven by an auxiliary power unit.

In addition to one or more of the features described above or below, or as an alternative, further embodiments may include where the one or more electric power sources include an energy storage system charged by the generator driven by the auxiliary power unit.

In addition to one or more of the features described above or below, or as an alternative, further embodiments may include where the energy storage system is charged by an engine-driven generator driven by the at least one gas turbine engine.

In addition to one or more of the features described above or below, or as an alternative, further embodiments may include where the controller is configured to determine a plurality of flight conditions including one or more flight inputs, a condition of the energy storage system, and a condition of the auxiliary power unit.

In addition to one or more of the features described above or below, or as an alternative, further embodiments may include where the controller is configured to determine a go-no-go threshold including a supplemental thrust provided by the electric auxiliary fan driving motor.

In addition to one or more of the features described above or below, or as an alternative, further embodiments may include where the controller is configured to determine a balanced field length based on the flight conditions and the go-no-go threshold to establish the plurality of takeoff thrust settings.

In addition to one or more of the features described above or below, or as an alternative, further embodiments may include where the takeoff thrust settings of the electric auxiliary fan driving motor are established based on a takeoff thrust demand, at least one condition of the one or more electric power sources, and a health status of the at least one gas turbine engine.

In addition to one or more of the features described above or below, or as an alternative, further embodiments may include an auxiliary fan transmission mechanically coupled to the at least one gas turbine engine and the electric auxiliary fan driving motor, the auxiliary fan transmission configured to selectively receive the motive force from either or both of the at least one gas turbine engine and the electric auxiliary fan driving motor, where the at least one auxiliary propulsion fan is operably coupled to the auxiliary fan transmission.

In addition to one or more of the features described above or below, or as an alternative, further embodiments may include where the at least one gas turbine engine includes a first gas turbine engine and a second gas turbine engine operably coupled through a shared drive shaft to the auxiliary fan transmission.

Also disclosed is a method includes providing an electric power input from one or more electric power sources to an electric auxiliary fan driving motor to produce an electric motor motive force. A gas turbine engine motive force is provided from at least one gas turbine engine. A plurality of takeoff thrust settings of the at least one gas turbine engine and the electric auxiliary fan driving motor is established. The electric motor motive force and the gas turbine engine motive force are combined to drive rotation of an auxiliary propulsion fan of an aircraft such that a minimum total aircraft thrust required for takeoff of the aircraft is produced as a function of at least a runway length.

In addition to one or more of the features described above or below, or as an alternative, further embodiments may include determining a plurality of flight conditions comprising one or more flight inputs, a condition of the energy storage system, and a condition of the auxiliary power unit.

In addition to one or more of the features described above or below, or as an alternative, further embodiments may include determining a go-no-go threshold including a supplemental thrust provided by the electric auxiliary fan driving motor.

In addition to one or more of the features described above or below, or as an alternative, further embodiments may include determining a balanced field length based on the flight conditions and the go-no-go threshold to establish the plurality of takeoff thrust settings, and iterating on a dual engine takeoff thrust setting, where the go-no-go threshold is based on a takeoff thrust of a single engine of the at least one gas turbine engine.

In addition to one or more of the features described above or below, or as an alternative, further embodiments may include where the flight inputs include one or more of: the runway length, a single engine takeoff runway length, an ambient temperature, and an aircraft gross weight.

A propulsion system for an aircraft includes a first gas turbine engine, a second gas turbine engine, a mechanical power mixing means operably coupled to the first gas turbine engine and the second gas turbine engine, an electric auxiliary fan driving motor configured to selectively receive electric power input from one or more electric power sources, and an auxiliary propulsion fan. The auxiliary propulsion fan is configured to selectively receive a motive force from either or both of the mechanical power mixing means and the electric auxiliary fan driving motor. The propulsion system also includes a controller configured to establish a plurality of takeoff thrust settings of the first gas turbine engine, the second gas turbine engine, and the electric auxiliary fan driving motor such that a minimum total aircraft thrust required for takeoff of the aircraft is produced.

In addition to one or more of the features described above or below, or as an alternative, further embodiments may include where the mechanical power mixing means includes a first engine drive shaft coupled through a first clutch to a gearbox, a second engine drive shaft coupled through a second clutch to the gearbox, and a shared drive shaft operably coupled between the gearbox and an auxiliary fan transmission operably coupled to the auxiliary propulsion fan.

In addition to one or more of the features described above or below, or as an alternative, further embodiments may include where the one or more electric power sources include one or more of a generator driven by an auxiliary power unit and an energy storage system, where controller is configured to determine a plurality of flight conditions including one or more flight inputs, a condition of the energy storage system, a condition of the auxiliary power unit, a go-no-go threshold including a supplemental thrust provided by the electric auxiliary fan driving motor; and a balanced field length based on the flight conditions to establish the plurality of takeoff thrust settings of the first and second gas turbine engines, the one or more electric power sources, and the electric auxiliary fan driving motor.

A technical effect of systems and methods is achieved by providing a propulsion system as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
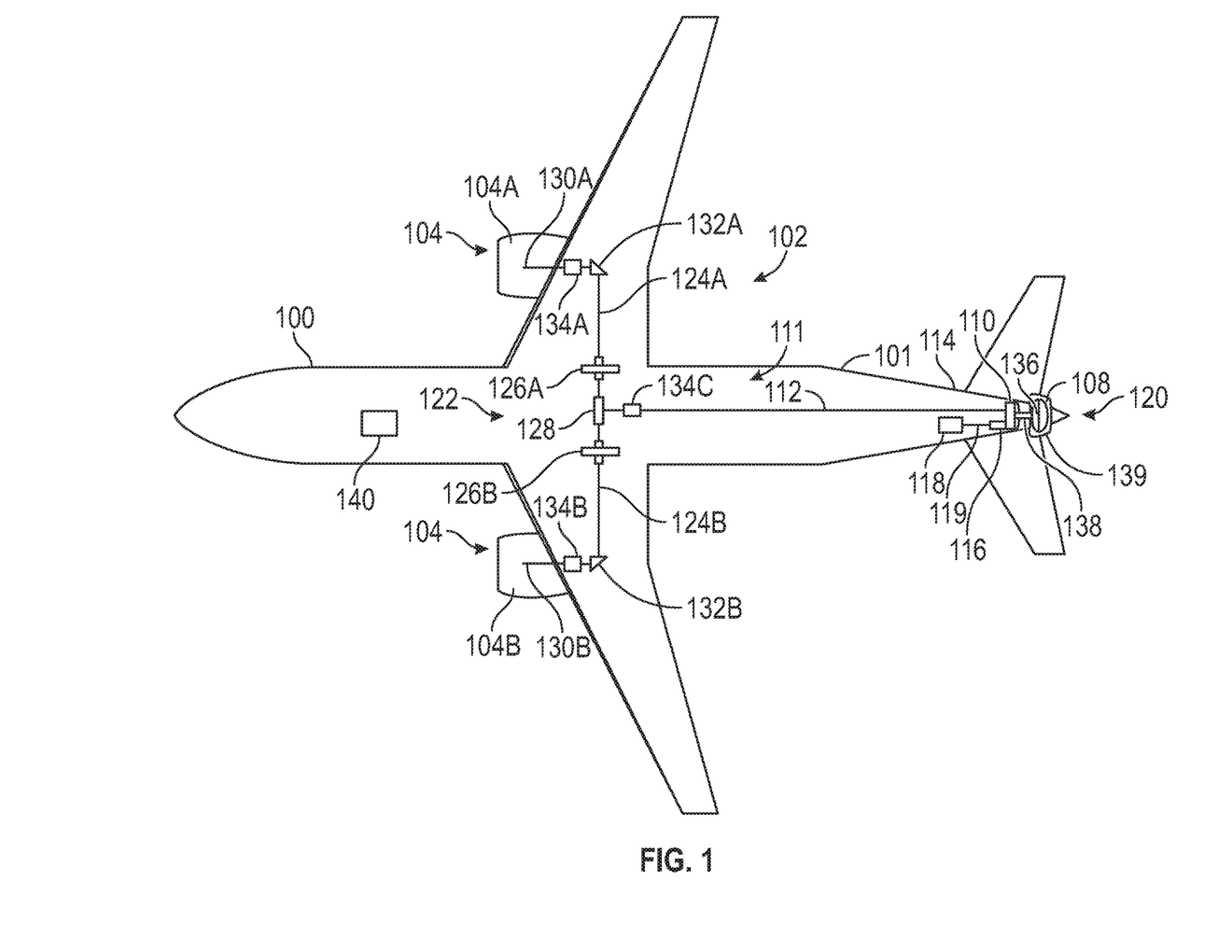
FIG. 1 is a schematic illustration of an aircraft including a propulsion system in accordance with an embodiment of the disclosure.

FIG. 1 schematically illustrates an exemplary aircraft 100 with a fuselage 101 and a propulsion system 102. The propulsion system 102 includes one or more gas turbine engines 104, and an auxiliary propulsion fan 108. The gas turbine engines 104 can be mounted in various configurations, such as under-wing mounted, top-of wing mounted, fuselage mounted, or other such configurations. The auxiliary propulsion fan 108 can be driven by a combination of power sources. In the example of FIG. 1, the auxiliary propulsion fan 108 is located in a tail section 114 of the aircraft 100 and can be mechanically driven by an auxiliary fan transmission 110 at the aft end 120 of the aircraft 100. Although a single instance of the auxiliary propulsion fan 108 is depicted in the tail section 114 of FIG. 1, it will be understood that the auxiliary propulsion fan 108 or multiple instances of the auxiliary propulsion fan 108 can be installed at various locations on the aircraft 100, such as along or within an aft portion of the fuselage 101. In the example of FIG. 1, the aircraft 100 includes a pair of gas turbine engines 104, depicted as a first gas turbine engine 104A and a second gas turbine engine 104B. The combination of the first gas turbine engine 104A, the second gas turbine engine 104B, and the auxiliary propulsion fan 108 provide distributed propulsion for the aircraft 100. The propulsion system 102 also includes an electric auxiliary fan driving motor 116 configured to selectively receive electric power input from one or more electric power sources 118. The one or more electric power sources 118 can include any combination of stored electric power (e.g., batteries, supercapacitors, hybrid storage systems, fuel cells) and/or generated electric power (e.g., an auxiliary power unit driven generator). The auxiliary fan transmission 110 is mechanically coupled to the gas turbine engines 104 and the electric auxiliary fan driving motor 116 as distributed propulsion power sources for the auxiliary propulsion fan 108. The auxiliary fan transmission 110 is configured to selectively receive a motive force from either or both of the gas turbine engines 104 and the electric auxiliary fan driving motor 116.

The propulsion system 102 can include a mechanical power mixing means 122 operably coupled to each of the gas turbine engines 104. The mechanical power mixing means 122 can be operably coupled to the auxiliary fan transmission 110 through a shared drive shaft 112 of a shaft system 111. The mechanical mixing means 122 can include a first engine drive shaft 124A coupled through a first clutch 126A to a gearbox 128 and a second engine drive shaft 124B coupled through a second clutch 126B to the gearbox 128, where the shared drive shaft 112 is operably coupled between the gearbox 128 and the auxiliary fan transmission 110. In the example of FIG. 1, the first clutch 126A and the second clutch 126B are each one-way clutches that can enable motive force balancing between the first and second gas turbine engines 104A, 104B and/or single engine operation of the shared drive shaft 112. To transfer power from the gas turbine engines 104 to the mechanical mixing means 122, one or more bevel gearboxes can be used. In the example of FIG. 1, a first engine coupling 130A, such as a tower shaft interface, can extract rotational energy from the first gas turbine engine 104A and drive rotation of the first engine drive shaft 124A through a first bevel gearbox 132A, and a second engine coupling 130B can extract rotational energy from the second gas turbine engine 104B and drive rotation of the second engine drive shaft 124B through a second bevel gearbox 132B. The first and second bevel gearboxes 132A, 132B can be air cooled and oil-filled with extended surfaces, for example. A combination of the first and second engine couplings 130A and 130B, the first and second engine drive shafts 124A and 124B, and the shared drive shaft 112 may be referred to as the shaft system 111.

In some embodiments, the propulsion system 102 includes at least one disconnect between the first gas turbine engine 104A, the second gas turbine engine 104B, and the auxiliary fan transmission 110, such as clutches 134A, 134B, 134C. For example, clutch 134A can be located between the first engine coupling 130A and the first bevel gearbox 132A. Clutch 134B can be located between the second engine coupling 130B and the second bevel gearbox 132B. Clutch 134C can be located between the gearbox 128 and the shared drive shaft 112. Other types and/or locations of mechanical disconnects to isolate motive force transmission are contemplated.

In embodiments, the propulsion system 102 is a hybrid electric system, where the auxiliary propulsion fan 108 is selectively powered by either or both electrically driven and mechanically driven motive forces. A controller 140 can determine when to drive rotation of the electric auxiliary fan driving motor 116 to supplement the mechanically driven motive force from the gas turbine engines 104 provided through the shared drive shaft 112. The shared powering through electrical and mechanical means can provide advantages over using only electrical or only mechanical power. For example, the size and electrical current requirements of the electric auxiliary fan driving motor 116 can be reduced in a hybrid configuration as compared to an all-electric configuration. Electrical coupling 119 between the electric power sources 118 and the electric auxiliary fan driving motor 116 may have a reduced length and/or power delivery requirements when the electric auxiliary fan driving motor 116 is designed to share the burden of driving the auxiliary propulsion fan 108 as compared to electrical power requirements from generators driven by the gas turbine engines 104. Higher current capacity wiring can result in added weight, reduced efficiency, and increased cross-coupling risks in an all-electric solution as compared to a hybrid solution. Depending upon an aircraft operating regime, system health, operating environment constraints, and other factors, the ratio of motive force provided by the gas turbine engines 104 and the electric auxiliary fan driving motor 116 through the auxiliary fan transmission 110 can be adjusted, for instance, by the controller 140, and/or other components (not depicted).

The controller 140 can include one or more channels and/or processing system components within the aircraft 100, such as a memory system to store instructions that are executed by a processing system of the controller 140. The executable instructions may be stored or organized in any manner and at any level of abstraction, such as in connection with a controlling and/or monitoring operation of the propulsion system 102. The processing system of the controller 140 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system of the controller 140 may include random access memory (RAM), read only memory (ROM), or other electronic, optical, magnetic, or any other computer readable medium onto which is stored data and control algorithms in a non-transitory form. The controller 140 may also interface with various sensors, actuators, air data systems, and other such systems of the aircraft 100 known in the art to accept various inputs and adjust performance of the propulsion system 102 accordingly.

During flight operations, such as during a cruise mode of operations, a boundary layer forms along the surface of the fuselage 101. The boundary layer creates drag and resists forward motion of the aircraft 100. Conventional aircraft size the gas turbine engines 104 to overcome the boundary layer drag during operation of the aircraft 100. This oversizing of the gas turbine engines 104 can result in decreases in the efficiency of engine operation.

The presence of the auxiliary propulsion fan 108 in a tail section 114 at the aft end 120 of the aircraft 100 can ingest the drag on the fuselage 101 and decrease the thrust requirement of the gas turbine engines 104. In some examples, the auxiliary propulsion fan 108 can generate up to 15% of the required thrust power for the aircraft 100. In such an example, the gas turbine engines 104 can be downsized to a corresponding 85% of the size that would be required absent the auxiliary propulsion fan 108. In other embodiments, the auxiliary propulsion fan 108 can generate up to 33% of the required thrust power for the aircraft 100. The auxiliary propulsion fan 108 can also provide supplemental power for various flight phases, such as takeoff, to reduce fuel burn and temperatures of the gas turbine engines 104. When multiple instances of the auxiliary propulsion fan 108 are utilized, various thrust producing ratios between the auxiliary propulsion fans 108 and one or more gas turbine engines 104 can be achieved while maintaining a minimum total thrust required from all sources of thrust on the aircraft 100 to perform within the limitation of such conditions as runway length with an engine inoperative. Further, the thrust provided by the auxiliary propulsion fan 108 can be reduced/modified depending upon the health status and/or electrical generation/storage capability of the propulsion system 102. For example, if one or more of the gas turbine engines 104 is not operational or experiences a fault during the takeoff phase, the auxiliary propulsion fan 108 can be driven primarily by the electric auxiliary fan driving motor 116 to provide some additional power to contribute to the takeoff power required to operate within the limits of the given runway and ambient temperature. If an auxiliary power unit of the electrical power sources 118 is degraded or stored energy in the electrical power sources 118 is low, the thrust provided by the auxiliary propulsion fan 108 may be reduced and one or more of the gas turbine engines 104 can be driven to a higher thrust setting, meaning the engine is operated with less thrust derate up to zero percent thrust derate, which is the full-rated takeoff thrust for the ambient temperature.

The auxiliary propulsion fan 108 may have various design features. In the example of FIG. 1, the auxiliary propulsion fan 108 includes two counter-rotating fans 136 driven by at least one fan drive shaft 138 coupled to an output of the auxiliary fan transmission 110. Counter rotation can eliminate the need for a static exit guide vane, which may be supported by a bearing compartment. In some embodiments, the auxiliary propulsion fan 108 is shrouded by a nacelle 139 or other structure. It will be understood that the aircraft 100 includes additional systems not depicted in FIG. 1.

Figure 2:
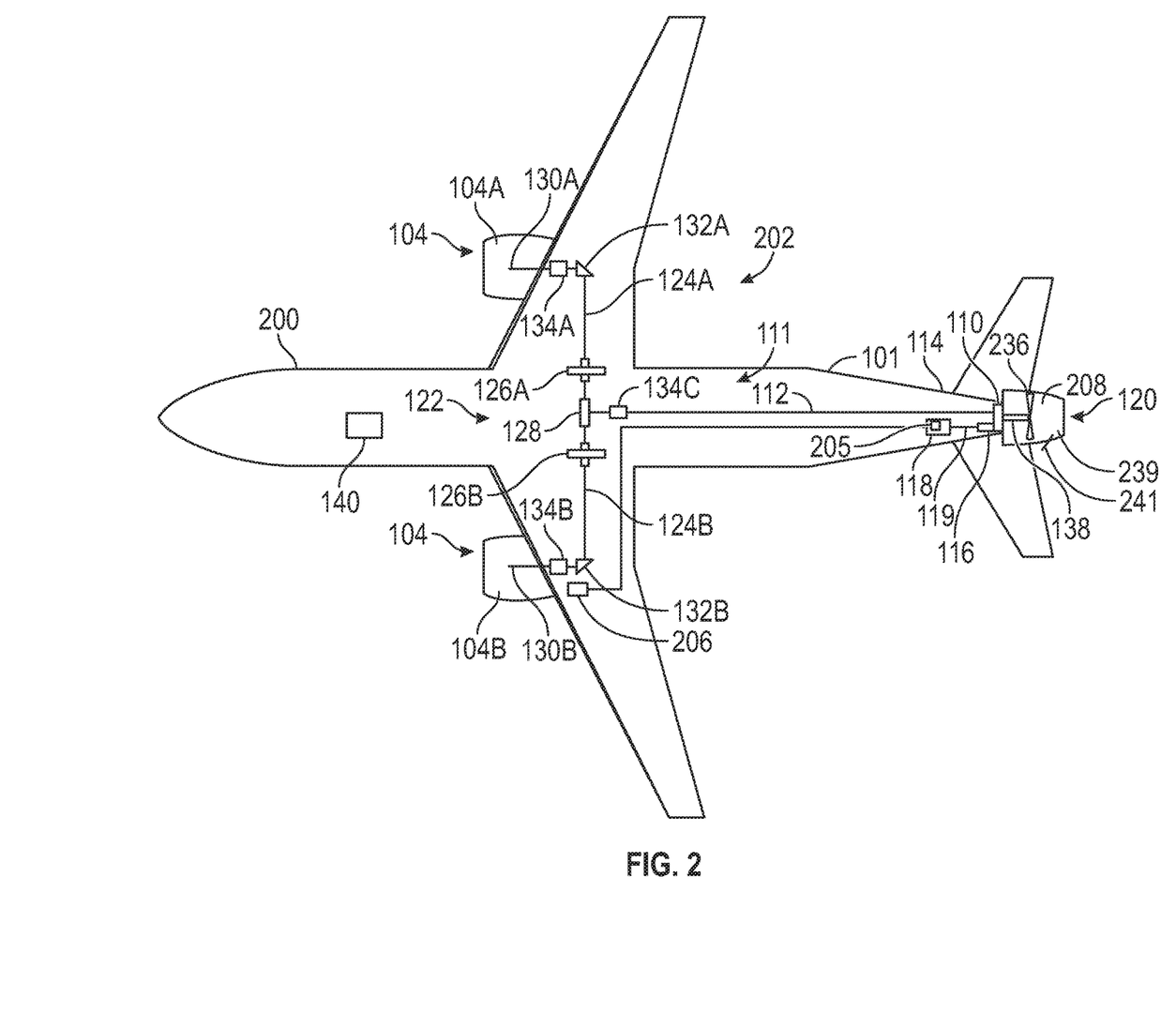
FIG. 2 is a schematic illustration of an aircraft including a propulsion system in accordance with an embodiment of the disclosure.

FIG. 2 schematically illustrates an exemplary aircraft 200 as an alternate embodiment of the aircraft 100 of FIG. 1, where like elements have like numbers as described with respect to FIG. 1. The aircraft 200 includes a propulsion system 202 with gas turbine engines 104, mechanical mixing means 122, and auxiliary fan transmission 110 mechanically coupled to the gas turbine engines 104 and electric auxiliary fan driving motor 116. Rather than including counter-rotating fans 136 as in the auxiliary propulsion fan 108 of FIG. 1, the propulsion system 202 includes an auxiliary propulsion fan 208 with a center rotating fan 236 driven by a fan drive shaft 138 coupled to an output of the auxiliary fan transmission 110. The center rotating fan 236 can be a variable pitch center rotating fan and/or may include variable guide vanes with a reversing function. A nacelle 239 external to the auxiliary propulsion fan 208 can include one or more thrust reversers 241. The thrust reverser 241 can be a cascade reverser, a bucket-type reverser, or other configuration known in the art. In some embodiments, the thrust reversers 241 can be sized for the aircraft 200 such that separate thrust reversers are not needed on the gas turbine engines 104.

In the example of FIG. 2, the propulsion system 202 includes at least one electric generator 206 operable to produce an electric current responsive to rotation driven by at least one gas turbine engine 104. Alternatively, the electric generator 206 can be driven by another component, such as one or more auxiliary power units. The electric generator 206 can provide electricity to the electric power sources 118, for instance, to recharge energy storage system 205 of the electric power sources 118. The energy storage system 205 can include one or more batteries, supercapacitors, hybrid storage systems, fuel cells, and/or other energy storage components known in the art. In embodiments, the electric generator 206 can either provide power to the electric auxiliary fan driving motor 116 or charge one or more components of the energy storage system 205, such as batteries or super/ultra-capacitors. It will be understood that the aircraft 200 includes additional systems not depicted in FIG. 2.

Figure 3:
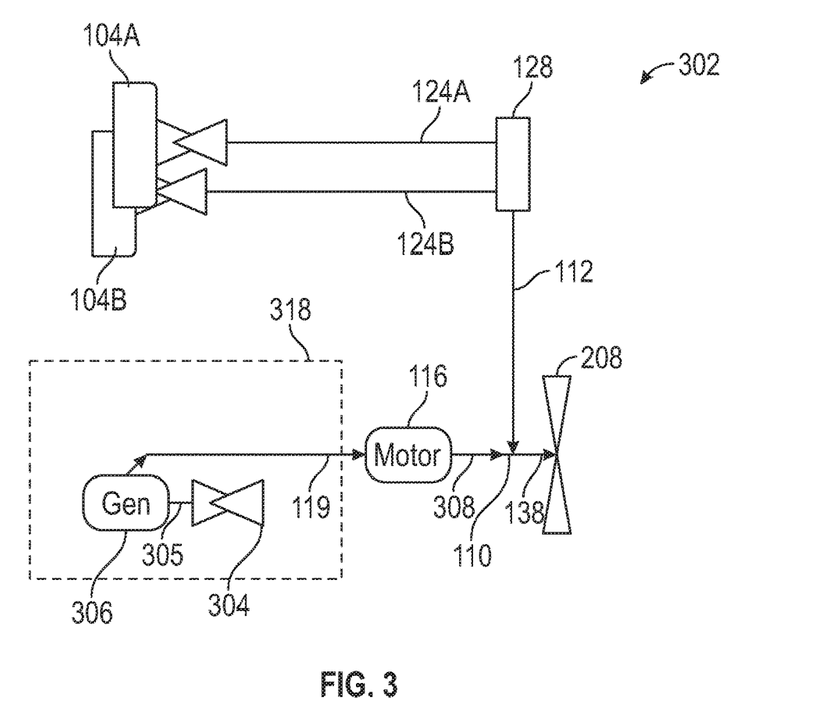
FIG. 3 is a schematic illustration of a propulsion system in accordance with an embodiment of the disclosure.

FIG. 3 is a schematic illustration of a propulsion system 302 in accordance with an embodiment. The propulsion system 302 depicts a simplified example of the propulsion system 202 of FIG. 2 including first and second gas turbine engines 104A, 104B coupled to the auxiliary fan transmission 110 through shared drive shaft 112 and electric auxiliary fan driving motor 116 coupled to the auxiliary fan transmission 110 through a motor output shaft 308. In FIG. 3, electric power source 318 is an embodiment of the electric power sources 118 of FIGS. 1 and 2, where the electric power source 318 includes an auxiliary power unit 304 coupled by a mechanical coupling 305 to a generator 306 that supplies electricity to the electric auxiliary fan driving motor 116 through the electrical coupling 119. The auxiliary power unit 304 can be a reduced size gas turbine engine as compared to the gas turbine engines 104, where the mechanical coupling 305 drives rotation of a rotor of the generator 306. The output of the generator 306 on the electrical coupling 119 can be conditioned to control the electric auxiliary fan driving motor 116, for instance, using an inverter/motor drive (e.g., inverter/motor drive 504 of FIG. 5) according to known motor control techniques. Operation of the auxiliary power unit 304 and control of the electric auxiliary fan driving motor 116 may be performed by the controller 140 of FIGS. 1 and 2 or other controllers (not depicted).

Figure 4:
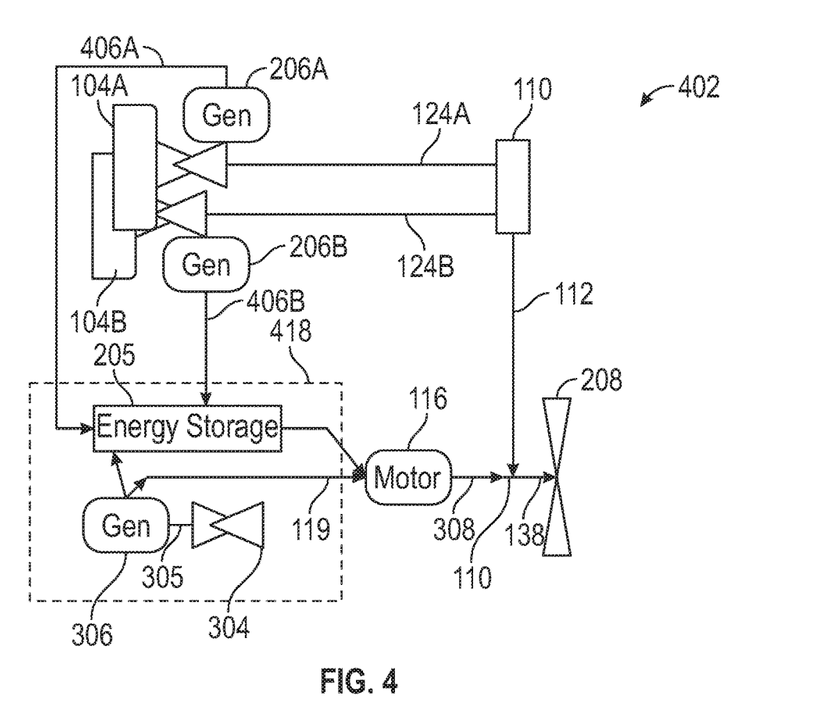
FIG. 4 is a schematic illustration of a propulsion system in accordance with an embodiment of the disclosure.

FIG. 4 is a schematic illustration of a propulsion system 402 in accordance with an embodiment. The propulsion system 402 is an alternate embodiment of the propulsion system 302 of FIG. 3. As a further variation to the electric power source 318 of FIG. 3, electric power source 418 of FIG. 4 includes the energy storage system 205 of FIG. 2. The energy storage system 205 can be recharged by the generator 306 driven by the auxiliary power unit 304 and/or by generators 206A, 206B driven by gas turbine engines 104A, 104B respectively. For example, an electrical coupling 406A from generator 206A can provide current to selectively recharge the energy storage system 205, and an electrical coupling 406B from generator 206B can provide current to selectively recharge the energy storage system 205 depending on operating conditions of the gas turbine engines 104A, 104B. For instance, during operating regimes where a reduced level of thrust is needed from the gas turbine engines 104A, 104B, recharging of the energy storage system 205 can be performed. Depending on the current demand of the electric auxiliary fan driving motor 116, either or both of the energy storage system 205 and the generator 306 driven by the auxiliary power unit 304 can output electric current on the electrical coupling 119 to the electric auxiliary fan driving motor 116. For example, during takeoff and climb, both the energy storage system 205 and the generator 306 may source current to the electric auxiliary fan driving motor 116. Alternatively, either the energy storage system 205 or the generator 306 may selectively source current to the electric auxiliary fan driving motor 116, for instance, depending on the current demand and health/capacity of the energy storage system 205 and the generator 306. Although depicted in FIG. 4, embodiments can omit the generators 206A, 206B and/or the electrical couplings 406A, 406B, where the energy storage system 205 is recharged only by the generator 306 or another source (not depicted).

Figure 5:
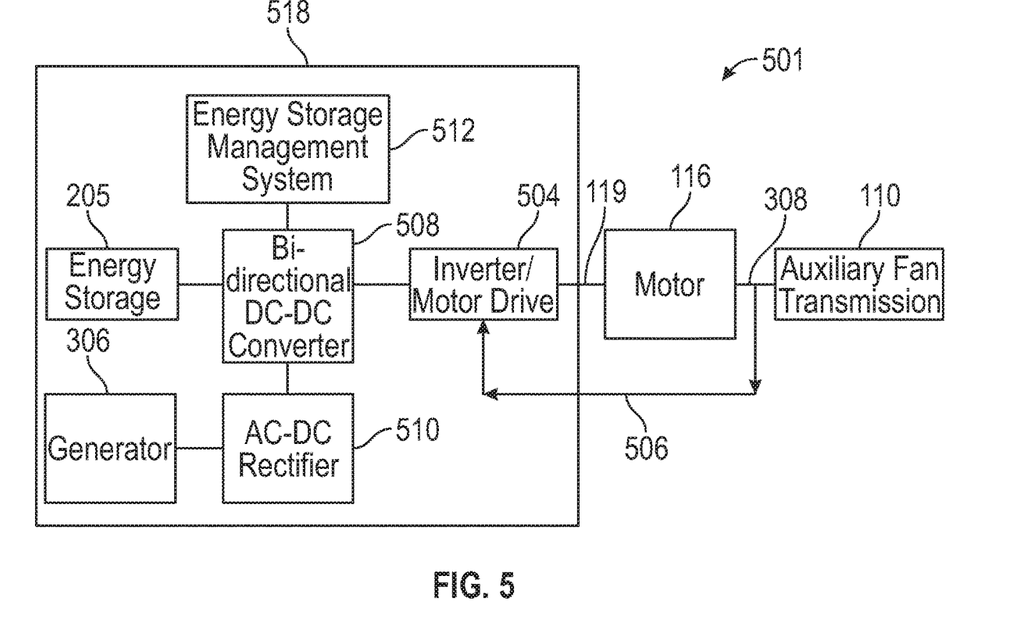
FIG. 5 is a schematic illustration of an electric auxiliary fan driving motor system in accordance with an embodiment of the disclosure.

FIG. 5 is a schematic illustration of an electric auxiliary fan driving motor system 501 as a further variation of an electrical drive system for the electric auxiliary fan driving motor 116. In the example of FIG. 5, electric power source 518 supplies electricity to the electric auxiliary fan driving motor 116 through the electrical coupling 119. The electric power source 518 can include an inverter/motor drive 504 operable to drive the electric auxiliary fan driving motor 116 to control the motor output shaft 308, for example, based on feedback 506, which may be a rotational speed of the motor output shaft 308 or other sensed parameter. The inverter/motor drive 504 may be configured as a variable speed/frequency drive to support a range of operating speeds of the electric auxiliary fan driving motor 116. The inverter/motor drive 504 can use known motor control techniques to control the speed and/or torque produced by the electric auxiliary fan driving motor 116. In the example of FIG. 5, the inverter/motor drive 504 is operable on direct current (DC) voltage received from a DC-to-DC converter 508. The DC-to-DC converter 508 can be a bi-directional converter to supply load power and voltage to the inverter/motor drive 504 and/or charge the energy storage system 205 as needed. Electrical power delivered by the generator 306 and/or the generators 206A, 206B of FIG. 4 may be alternating current (AC). One or more AC-DC rectifiers 510 can convert the AC to DC for the DC-to-DC converter 508. Differences in the DC voltage levels of the energy storage system 205, inverter/motor drive 504, and AC-DC rectifiers 510 can be managed by power conditioning circuitry of the DC-to-DC converter 508. The electric power source 518 can also include an energy storage management system 512, which may perform temperature monitoring of the energy storage system 205 and control DC-DC conversion performed by the DC-to-DC converter 508. Although depicted separately, the energy storage management system 512 can be integrated with the energy storage system 205 or the DC-to-DC converter 508.

Figure 6:
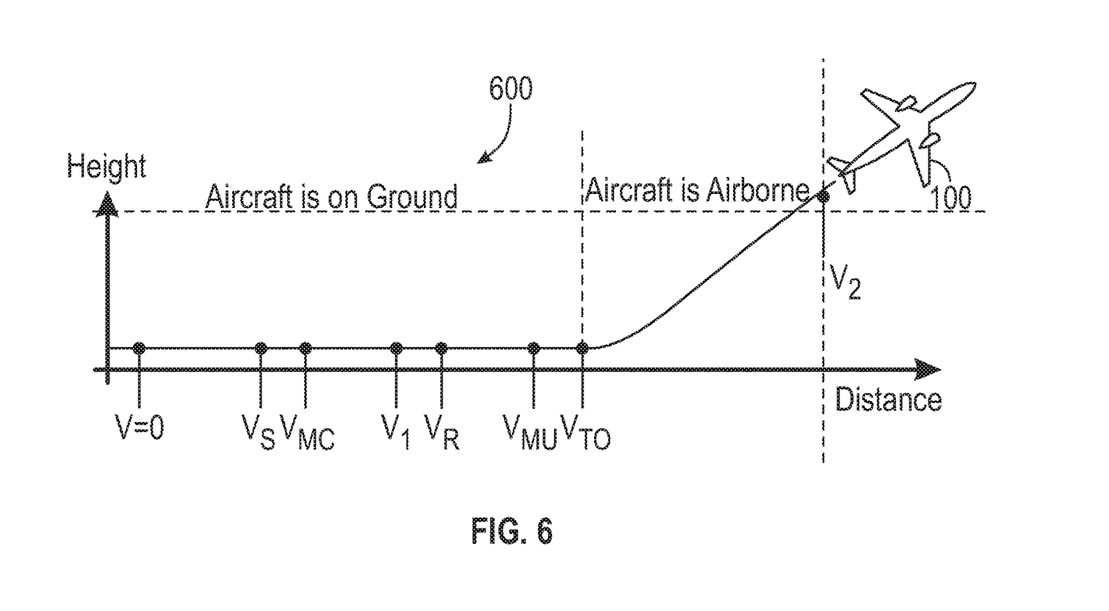
FIG. 6 is an aircraft takeoff plot in accordance with an embodiment of the disclosure.
Figure 7:
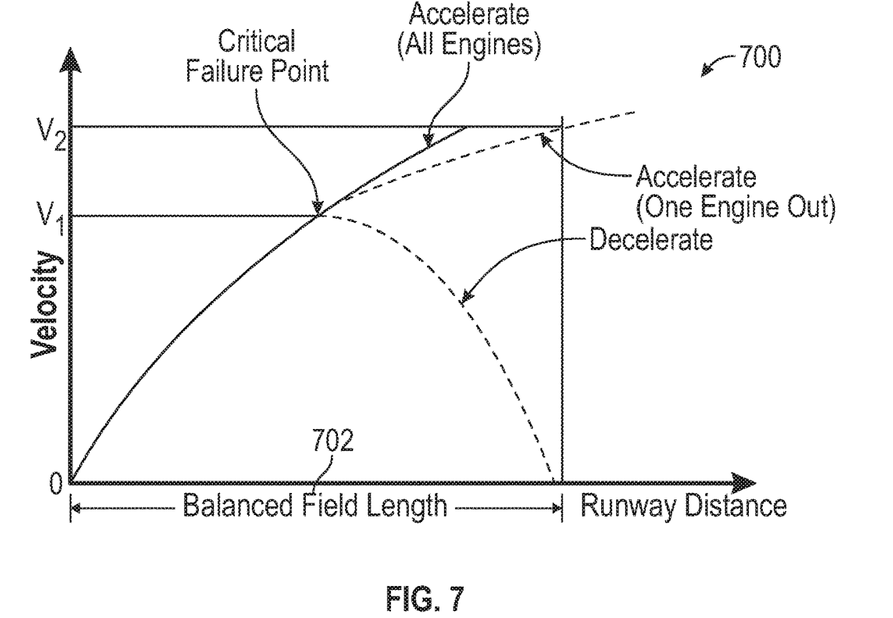
FIG. 7 is an aircraft takeoff decision plot in accordance with an embodiment of the disclosure.

FIGS. 6 and 7 illustrate examples of an aircraft takeoff plot 600 and an aircraft takeoff decision plot 700. The aircraft takeoff plot 600 and the aircraft takeoff decision plot 700 can be used for thrust control decisions by the controller 140 of FIG. 1 in combination with other data sources. An aircraft, such as aircraft 100, can initiate a takeoff from zero velocity (V=0) until a takeoff speed ($V_{TO}$) is reached after traveling a distance along a runway. Various relative velocities encountered during a normal takeoff can be defined for a takeoff process. The aircraft 100 accelerates through a stall speed ($V_S$), a minimum controllable speed ($V_{MC}$), a decision speed ($V_1$) where safe stopping can still be achieved on the ground, a rotation speed ($V_R$) where the nose of the aircraft 100 is pitched up, a minimum unstick speed for the tail to clear the runway at maximum rotation, and a takeoff end speed ($V_2$) where sufficient altitude is acquired. If a propulsion system failure occurs above the decision speed ($V_1$), then takeoff continues. At the decision speed ($V_1$), the distance required to stop may be substantially equal to the distance required to takeoff. A balanced field length 702 can be defined as a distance needed to reach the decision speed ($V_1$) and safely stop if a takeoff is aborted at the decision speed ($V_1$). These factors can be used to determine takeoff thrust settings for distributed propulsion in the propulsion systems 102, 202, 302, 402 of FIGS. 1-4, where propulsion demand is distributed between the gas turbine engines 104 and the auxiliary propulsion fan 108, 208.

Figure 8:
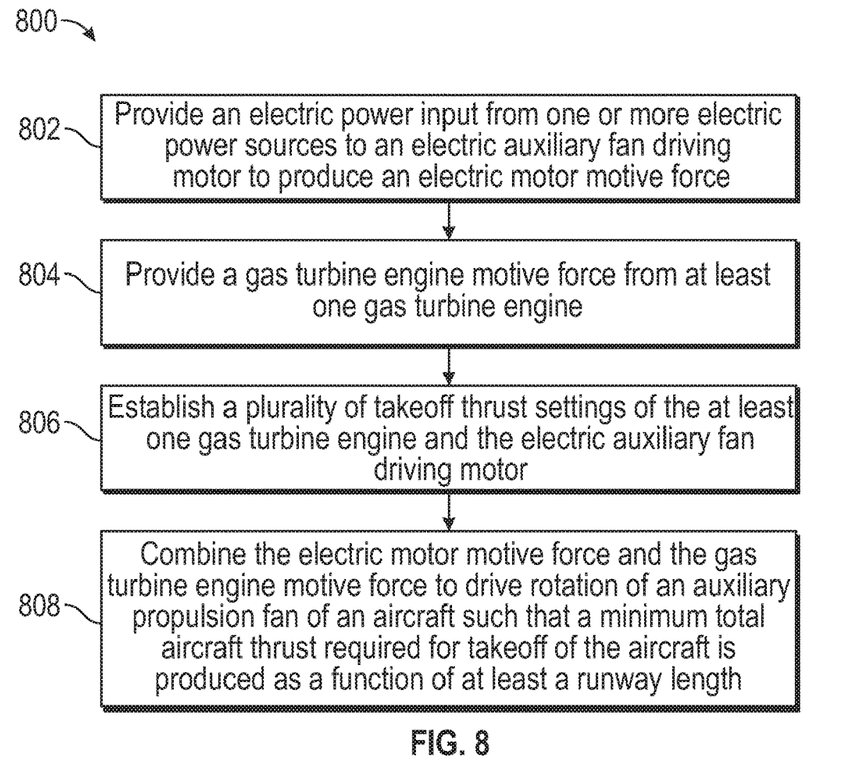
FIG. 8 is a flow chart illustrating a method in accordance with an embodiment of the disclosure.

FIG. 8 is a flow chart illustrating a method 800 of operating a propulsion system of an aircraft, such as the propulsion system 102 of aircraft 100 of FIG. 1, in accordance with an embodiment. The method 800 of FIG. 8 is described in reference to FIGS. 1-8 and may be performed with an alternate order and include additional steps. The method 800 can be performed, for example, by the propulsion systems 102, 202, 302, 402 of FIGS. 1-4.

At block 802, an electric power input is provided from one or more electric power sources 118 to an electric auxiliary fan driving motor 116 to produce an electric motor motive force. The one or more electric power sources 118 can include a generator 306 driven by an auxiliary power unit 304, such as the electric power sources 318, 418, 518. Further, the one or more electric power sources 118 can include an energy storage system 205 charged by one or more of the generator 306 driven by the auxiliary power unit 304 and an engine-driven generator 206 driven by the at least one gas turbine engine 104.

At block 804, a gas turbine engine motive force is provided from at least one gas turbine engine 104 through a shaft system 111 to an auxiliary fan transmission 110. For example, a first gas turbine engine 104A and a second gas turbine engine 104B can be operably coupled through a shared drive shaft 112 to provide the gas turbine engine motive force to the auxiliary fan transmission 110.

At block 806, a plurality of takeoff thrust settings of the at least one gas turbine engine 104 and the electric auxiliary fan driving motor 116. The takeoff thrust settings may be determined iteratively depending on a plurality of conditions as further described with respect to FIG. 9.

At block 808, the electric motor motive force and the gas turbine engine motive force are mechanically combined at the auxiliary fan transmission 110 to drive rotation of an auxiliary propulsion fan 108 operably coupled to the auxiliary fan transmission 110. The controller 140 can determine takeoff thrust settings for the at least one gas turbine engine 104 and the electric auxiliary fan driving motor 116 such that a minimum total aircraft thrust required for takeoff of the aircraft 100 is produced as a function of at least a runway length.

Figure 9:
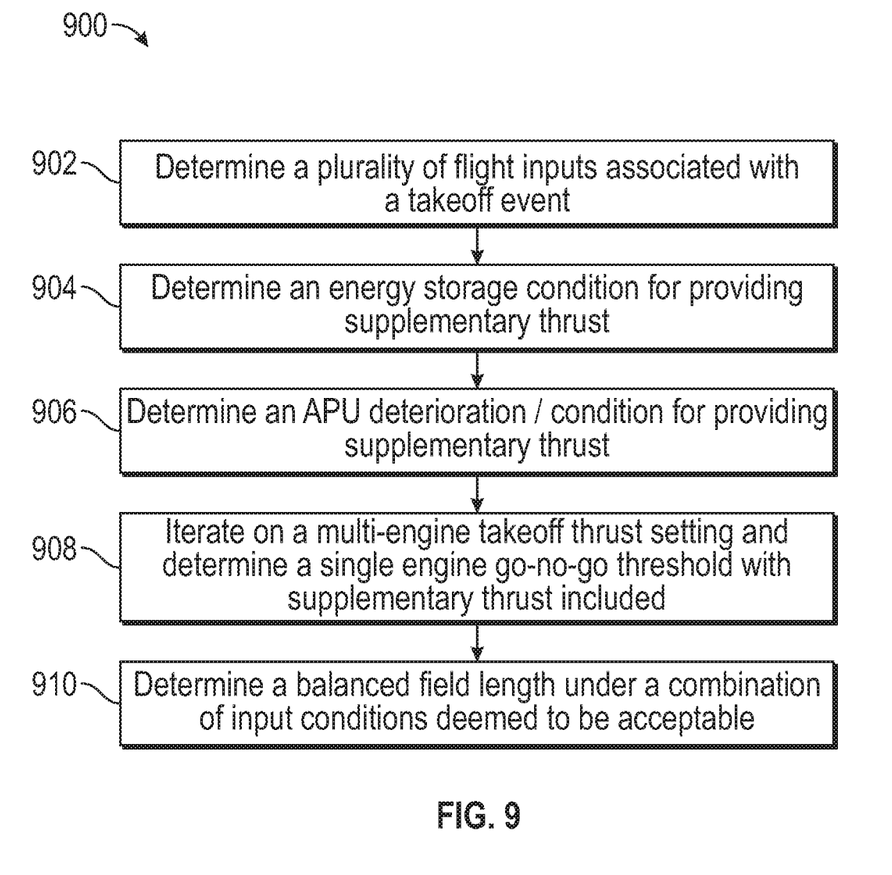
FIG. 9 is a flow chart illustrating a method in accordance with an embodiment of the disclosure.

FIG. 9 is a flow chart illustrating a method 900 of operating a propulsion system of an aircraft, such as the propulsion system 102 of aircraft 100 of FIG. 1, in accordance with an embodiment. The method 900 of FIG. 9 is described in reference to FIGS. 1-9 and may be performed with an alternate order and include additional steps. The method 900 can be performed, for example, by the propulsion systems 102, 202, 302, 402 of FIGS. 1-4. Determinations can be made by the controller 140 in combination with other controls and/or data sources.

At block 902, the controller 140 can determine a plurality of flight inputs associated with a takeoff event. The flight inputs can include, for instance, one or more of: a runway length, a single engine takeoff runway length, an ambient temperature, and an aircraft gross weight. The flight inputs can be received from a combination of sensors and/or flight crew input.

At block 904, the controller 140 can determine a condition of the energy storage system 205 for providing supplementary thrust through the electric auxiliary fan driving motor 116. For example, the energy storage management system 512 may track a storage energy status of the energy storage system 205 and provide the storage energy status and/or diagnostic information to the controller 140.

At block 906, the controller 140 can determine whether deterioration or other condition of the auxiliary power unit 304 and/or generator 306 will likely impact the ability to provide supplementary thrust through the electric auxiliary fan driving motor 116. For example, startup tests, maintenance flags, diagnostics, and other health monitors may be used to assess the ability of the auxiliary power unit 304 and/or generator 306 to produce electric current sufficient to meet a peak current demand expected for the electric auxiliary fan driving motor 116.

At block 908, the controller 140 can iterate on a dual engine takeoff thrust setting and determine a go-no-go threshold (for decision speed $V_1$) with supplementary thrust included as provided by the auxiliary propulsion fan 108. The go-no-go threshold can be based on a takeoff thrust of a single engine of the at least one gas turbine engine 104. The iteration can include testing different values of settings to identify at least one combination of settings meeting known constraints and conditions. In some instances, the supplemental thrust available may be low or zero based on a low charge in the energy storage system 205 and/or a condition of the auxiliary power unit 304 or generator 306. If the supplemental thrust available cannot meet a desired thrust level, a greater thrust demand may be placed on the gas turbine engines 104 or other limits may be adjusted, such as lowering an aircraft gross weight limit and a takeoff temperature limit or extending a runway length constraint, for example.

At block 910, the controller 140 can determine a balanced field length 702 based on flight conditions to establish a plurality of takeoff thrust settings of the at least one gas turbine engine 104, the one or more electric power sources 118, and the electric auxiliary fan driving motor 116. If the balanced field length 702 is deemed insufficient relative to a runway distance available for achievable takeoff thrust settings, a pilot alert can be triggered. The pilot alert may result in actions to lower on-board weight (e.g., dump fuel), request a different runway if available, and/or other actions. The flight conditions can include one or more flight inputs, a condition of the energy storage system 205, a condition of the auxiliary power unit 304, and a go-no-go threshold including supplemental thrust provided by the electric auxiliary fan driving motor 116, for instance, as determined in blocks 902-908. Takeoff thrust settings can also include adjustments/reductions (derating) of full takeoff thrust to match current conditions, such as ambient temperature, gross weight, runway constraints, and the like.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A propulsion system for an aircraft, the propulsion system comprising:
    at least one gas turbine engine;
    an electric auxiliary fan driving motor configured to selectively receive electric power input from one or more electric power sources;
    at least one auxiliary propulsion fan configured to selectively receive a motive force from either or both of the at least one gas turbine engine and the electric auxiliary fan driving motor; and
    a controller configured to establish a plurality of takeoff thrust settings of the at least one gas turbine engine and the electric auxiliary fan driving motor such that a minimum total aircraft thrust required for takeoff of the aircraft is produced, wherein the takeoff thrust settings of the electric auxiliary fan driving motor are established based on a takeoff thrust demand, at least one condition of the one or more electric power sources, and a health status of the at least one gas turbine engine.

2. The propulsion system of claim 1, wherein the one or more electric power sources comprise a generator driven by an auxiliary power unit.

3. The propulsion system of claim 2, wherein the one or more electric power sources comprise an energy storage system charged by the generator driven by the auxiliary power unit.

4. The propulsion system of claim 3, wherein the energy storage system is charged by an engine-driven generator driven by the at least one gas turbine engine.

5. The propulsion system of claim 3, wherein the controller is configured to determine a plurality of flight conditions comprising one or more flight inputs, a condition of the energy storage system, and a condition of the auxiliary power unit.

6. The propulsion system of claim 5, wherein the controller is configured to determine a go-no-go threshold including a supplemental thrust provided by the electric auxiliary fan driving motor.

7. The propulsion system of claim 6, wherein the controller is configured to determine a balanced field length based on the flight conditions and the go-no-go threshold to establish the plurality of takeoff thrust settings.

8. The propulsion system of claim 1, further comprising:
    an auxiliary fan transmission mechanically coupled to the at least one gas turbine engine and the electric auxiliary fan driving motor, the auxiliary fan transmission configured to selectively receive the motive force from either or both of the at least one gas turbine engine and the electric auxiliary fan driving motor, wherein the at least one auxiliary propulsion fan is operably coupled to the auxiliary fan transmission.

9. The propulsion system of claim 8, wherein the at least one gas turbine engine comprises a first gas turbine engine and a second gas turbine engine operably coupled through a shared drive shaft to the auxiliary fan transmission.

10. A method comprising:
    providing an electric power input from one or more electric power sources to an electric auxiliary fan driving motor to produce an electric motor motive force;
    providing a gas turbine engine motive force from at least one gas turbine engine;
    establishing a plurality of takeoff thrust settings of the at least one gas turbine engine and the electric auxiliary fan driving motor; and
    combining the electric motor motive force and the gas turbine engine motive force to drive rotation of an auxiliary propulsion fan of an aircraft such that a minimum total aircraft thrust required for takeoff of the aircraft is produced as a function of at least a runway length.

11. The method of claim 10, wherein the one or more electric power sources comprise a generator driven by an auxiliary power unit.

12. The method of claim 11, wherein the one or more electric power sources comprise an energy storage system charged by one or more of the generator driven by the auxiliary power unit and an engine-driven generator driven by the at least one gas turbine engine.

13. The method of claim 12, further comprising: determining a plurality of flight conditions comprising one or more flight inputs, a condition of the energy storage system, and a condition of the auxiliary power unit.

14. The method of claim 13, further comprising:
    determining a go-no-go threshold including a supplemental thrust provided by the electric auxiliary fan driving motor.

15. The method of claim 14, further comprising:
    determining a balanced field length based on the flight conditions and the go-no-go threshold to establish the plurality of takeoff thrust settings; and
    iterating on a dual engine takeoff thrust setting, wherein the go-no-go threshold is based on a takeoff thrust of a single engine of the at least one gas turbine engine.

16. The method of claim 15, wherein the flight inputs comprise one or more of: the runway length, a single engine takeoff runway length, an ambient temperature, and an aircraft gross weight.

17. A propulsion system for an aircraft, the propulsion system comprising:
- a first gas turbine engine;
- a second gas turbine engine; a mechanical power mixing means operably coupled to the first gas turbine engine and the second gas turbine engine;
- an electric auxiliary fan driving motor configured to selectively receive electric power input from one or more electric power sources;
- an auxiliary propulsion fan configured to selectively receive a motive force from either or both of the mechanical power mixing means and the electric auxiliary fan driving motor; and
- a controller configured to establish a plurality of takeoff thrust settings of the first gas turbine engine, the second gas turbine engine, and the electric auxiliary fan driving motor such that a minimum total aircraft thrust required for takeoff of the aircraft is produced based on determining a balanced field length corresponding to a plurality of flight conditions to establish the plurality of takeoff thrust settings of the first and second gas turbine engines, the one or more electric power sources, and the electric auxiliary fan driving motor.

18. The propulsion system of claim 17, wherein the mechanical power mixing means comprises a first engine drive shaft coupled through a first clutch to a gearbox, a second engine drive shaft coupled through a second clutch to the gearbox, and a shared drive shaft operably coupled between the gearbox and an auxiliary fan transmission operably coupled to the auxiliary propulsion fan.

19. The propulsion system of claim 17, wherein the one or more electric power sources comprise one or more of a generator driven by an auxiliary power unit and an energy storage system, wherein controller is configured to determine the plurality of flight conditions comprising one or more flight inputs, a condition of the energy storage system, a condition of the auxiliary power unit, a go-no-go threshold including a supplemental thrust provided by the electric auxiliary fan driving motor.

* * * * *